(12) United States Patent
Tran (10) Patent No.: US 10,552,158 B2
(45) Date of Patent: Feb. 4, 2020

(54) REORDER BUFFER SCOREBOARD HAVING MULTIPLE VALID BITS TO INDICATE A LOCATION OF DATA

(71) Applicant: Synopsys, Inc., Mountain View, CA (US)

(72) Inventor: Thang Tran, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 129 days.

(21) Appl. No.: 15/240,994

(22) Filed: Aug. 18, 2016

(65) Prior Publication Data

US 2018/0052690 A1  Feb. 22, 2018

(51) Int. Cl.
*G06F 9/38*  (2018.01)

(52) U.S. Cl.
CPC ............ *G06F 9/384* (2013.01); *G06F 9/3802* (2013.01); *G06F 9/3855* (2013.01)

(58) Field of Classification Search
CPC ...... G06F 9/3836; G06F 9/3838; G06F 9/384; G06F 9/3855
USPC ....................................................... 712/217
See application file for complete search history.

(56) References Cited

U.S. PATENT DOCUMENTS

| | | | |
|---|---|---|---|
| 5,274,790 A | 12/1993 | Suzuki | |
| 5,333,284 A | 7/1994 | Nugent | |
| 5,463,745 A | 10/1995 | Vidwans et al. | |
| 5,471,591 A | 11/1995 | Edmondson et al. | |
| 5,519,864 A * | 5/1996 | Martell | G06F 9/3836 710/5 |
| 5,584,038 A * | 12/1996 | Papworth | G06F 5/14 711/110 |
| 5,675,758 A | 10/1997 | Sowadsky et al. | |
| 5,684,971 A * | 11/1997 | Martell | G06F 9/3836 712/214 |

(Continued)

OTHER PUBLICATIONS

Pandey, R., Lecture Notes—"Process and Thread Scheduling", Department of Computer Sciences, University of California, Davis, Winter 2005, pp. 1-42.

(Continued)

*Primary Examiner* — Benjamin P Geib
*Assistant Examiner* — Shawn Doman
(74) *Attorney, Agent, or Firm* — Fenwick & West LLP (57) ABSTRACT

Various embodiments of a microprocessor include a scoreboard implementation that directs the microprocessor to the location of data values. For example, the scoreboard may include individual bits that instruct the microprocessor to retrieve the data from a re-order buffer, retire queue, result bus, or register file. As a first step, the microprocessor receives an instruction indicating a process that requires data from one or more source registers. Instead of automatically retrieving the data from the register file, which is a costly process, the microprocessor may read the scoreboard to determine whether the needed data can be more cost-effectively retrieved from the re-order buffer, retire queue, or result busses. Therefore, the microprocessor can avoid costly data retrieval procedures. Additionally, the scoreboard implementation enables the microprocessor to handle limited out-of-order instructions, which improves overall performance of the microprocessor.

18 Claims, 8 Drawing Sheets

(56) References Cited

U.S. PATENT DOCUMENTS

| | | | |
|---|---|---|---|
| 5,761,476 A * | 6/1998 | Martell | G06F 9/3836 712/217 |
| 5,948,098 A | 9/1999 | Leung et al. | |
| 6,076,145 A | 6/2000 | Iwata et al. | |
| 6,108,769 A * | 8/2000 | Chinnakonda | G06F 9/30036 712/216 |
| 6,112,019 A | 8/2000 | Chamdani et al. | |
| 6,205,543 B1 | 3/2001 | Tremblay et al. | |
| 6,233,599 B1 | 5/2001 | Nation et al. | |
| 6,247,094 B1 | 6/2001 | Kumar et al. | |
| 6,272,520 B1 | 8/2001 | Sharangpani et al. | |
| 6,341,301 B1 | 1/2002 | Hagan | |
| 6,408,325 B1 | 6/2002 | Shaylor | |
| 6,425,072 B1 * | 7/2002 | Meier | G06F 9/3836 712/218 |
| 6,557,078 B1 | 4/2003 | Mulla et al. | |
| 6,697,939 B1 | 2/2004 | Kahle | |
| 6,785,803 B1 | 8/2004 | Merchant et al. | |
| 7,143,243 B2 | 11/2006 | Miller | |
| 7,434,032 B1 | 10/2008 | Coon et al. | |
| 7,610,473 B2 | 10/2009 | Kissell | |
| 7,644,221 B1 | 1/2010 | Chan et al. | |
| 9,348,595 B1 | 5/2016 | Mizrahi et al. | |
| 2001/0056456 A1 | 12/2001 | Cota-Robles | |
| 2002/0083304 A1 * | 6/2002 | Leenstra | G06F 9/3836 712/218 |
| 2003/0005263 A1 | 1/2003 | Eickemeyer et al. | |
| 2003/0005266 A1 | 1/2003 | Akkary et al. | |
| 2003/0033509 A1 | 2/2003 | Leibholz et al. | |
| 2003/0061467 A1 | 3/2003 | Yeh et al. | |
| 2004/0015684 A1 | 1/2004 | Peterson | |
| 2004/0139306 A1 | 7/2004 | Albuz et al. | |
| 2004/0172523 A1 | 9/2004 | Merchant et al. | |
| 2004/0243764 A1 | 12/2004 | Miller | |
| 2005/0044327 A1 | 2/2005 | Howard et al. | |
| 2005/0125802 A1 | 6/2005 | Wang et al. | |
| 2005/0149936 A1 | 7/2005 | Pilkington | |
| 2005/0273580 A1 | 12/2005 | Chaudhry et al. | |
| 2006/0117316 A1 | 6/2006 | Cismas et al. | |
| 2007/0136562 A1 * | 6/2007 | Caprioli | G06F 9/3824 712/217 |
| 2007/0204137 A1 | 8/2007 | Tran | |
| 2007/0266387 A1 | 11/2007 | Henmi | |
| 2008/0082755 A1 | 4/2008 | Kornegay et al. | |
| 2008/0295105 A1 | 11/2008 | Ozer et al. | |
| 2009/0037698 A1 * | 2/2009 | Nguyen | G06F 9/3836 712/217 |
| 2010/0031268 A1 | 2/2010 | Dwyer et al. | |
| 2010/0082945 A1 | 4/2010 | Adachi et al. | |
| 2010/0083267 A1 | 4/2010 | Adachi et al. | |
| 2010/0138608 A1 | 6/2010 | Rappaport et al. | |
| 2010/0250902 A1 | 9/2010 | Abernathy et al. | |
| 2011/0067034 A1 | 3/2011 | Kawamoto | |
| 2011/0296423 A1 | 12/2011 | Elnozahy et al. | |
| 2012/0054447 A1 | 3/2012 | Swart et al. | |
| 2012/0173818 A1 | 7/2012 | Martin | |
| 2012/0278596 A1 | 11/2012 | Tran et al. | |
| 2012/0303936 A1 | 11/2012 | Tran et al. | |
| 2013/0290639 A1 * | 10/2013 | Tran | G06F 9/30032 711/125 |
| 2013/0297912 A1 * | 11/2013 | Tran | G06F 9/3814 712/208 |
| 2013/0297916 A1 | 11/2013 | Suzuki et al. | |
| 2013/0339619 A1 | 12/2013 | Roy | |
| 2014/0047215 A1 | 2/2014 | Ogasawara | |
| 2014/0109098 A1 | 4/2014 | Sato et al. | |
| 2014/0189324 A1 * | 7/2014 | Combs | G06F 9/384 712/225 |
| 2014/0372732 A1 * | 12/2014 | Fleischman | G06F 9/3842 712/214 |
| 2015/0220347 A1 | 8/2015 | Glossner et al. | |
| 2016/0004534 A1 | 1/2016 | Padmanabha et al. | |
| 2016/0246728 A1 | 8/2016 | Ron et al. | |
| 2016/0291982 A1 | 10/2016 | Mizrahi et al. | |
| 2016/0306633 A1 | 10/2016 | Mizrahi et al. | |
| 2017/0046164 A1 | 2/2017 | Madhavan et al. | |
| 2017/0168949 A1 | 6/2017 | Jackson et al. | |

OTHER PUBLICATIONS

Markovic, N., "Hardware Thread Scheduling Algorithms for Single-ISA Asymmetric CMPS," Polytechnic University of Catalonia, Nov. 2015, pp. 1-124.

* cited by examiner

REORDER BUFFER SCOREBOARD HAVING MULTIPLE VALID BITS TO INDICATE A LOCATION OF DATA

TECHNICAL FIELD

The present disclosure relates generally to processing devices and more particularly relates to data dependency management at a processing device.

BACKGROUND

Design of microprocessor architecture enables the efficient handling of instructions to allow for smooth user experiences. Many hardware improvements have been implemented including the use of a re-order buffer (ROB) that can store instructions and register data. However, the ROB is a large structure and continual access of the ROB, especially for frequent checking of data dependency, is a slow and resource intensive process. As the ROB continues to increase in size to 64 or 128 entries, ROB associative search becomes a significant bottleneck for the clock frequency. To overcome this, subsequent implementations of microprocessor architecture has utilized a separate register known as a future file.

A future file holds a copy of speculative data that may be rapidly accessed upon further instructions, thereby eliminating the need to consistently access the ROB. However, future files continue to increase in size (e.g. 32 registers) with the increasing complexities of today's microprocessor architecture. Thus, accessing the future file has also become a resource intensive action, resulting in the loss of the advantages initially conferred by the development of a future file.

A parallel problem with conventional microprocessor architecture is the implementation of downstream reservation stations (RS) that receive all source operand data from the future file. The RS holds the source operand data, which requires large data width for each RS entry. Thus, processing of instructions and data through the RS becomes a resource intensive process as well.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview Configuration

To improve processor speed and efficiency, disclosed is a scoreboard configuration for use in microprocessor architecture. By way of example, this disclosure describes a scoreboard that directs the microprocessor to the location of the required data in order to prevent resource intensive checking of multiple locations. In one embodiment, instructions are loaded and accessed to entries in the scoreboard to identify the location of the data as well as whether that data is valid and available to be accessed. Under the direction of a scoreboard, cost of hardware and power consumption may be reduced with the elimination of a future file and the removal of duplicated data storage.

A further understanding of the nature and advantages of the present disclosure may be realized by reference to the remaining portions of the specification and the drawings.

Example Pipeline Architecture of a Microprocessor with a Scoreboard

Figure 1:
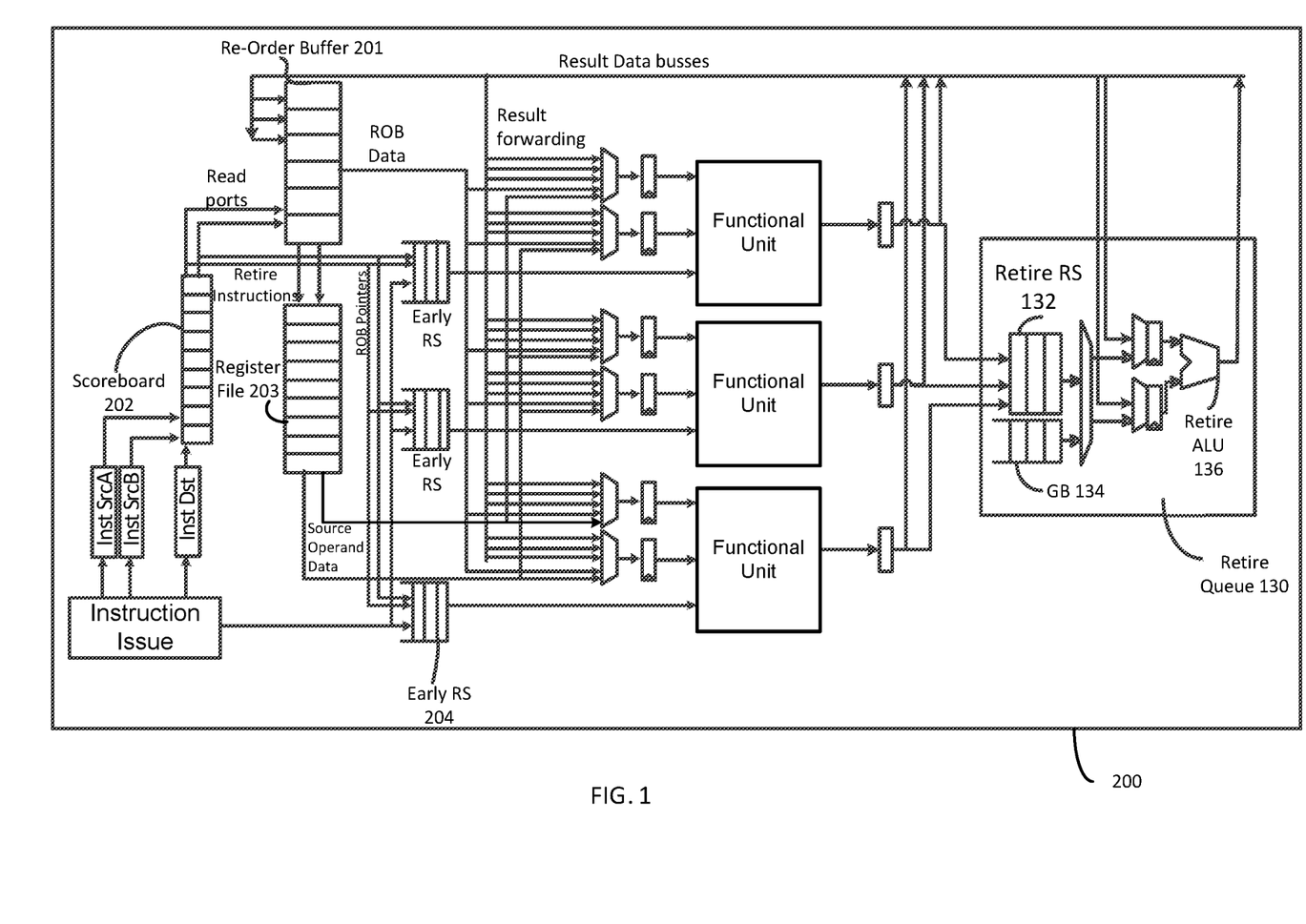
FIG. 1 is an exemplary pipeline architecture of a microprocessor with the implementation of a scoreboard, according to an embodiment.

FIG. 1 illustrates a microprocessor architecture 200, according to an example embodiment. The process described below may be executed by a microprocessor having the architecture illustrated in FIG. 1. Here, the instructions, comprising two source registers and a destination register, are issued. The microprocessor reads the scoreboard 202 to determine the location of the data. If the data is located within the re-order buffer (ROB) 201, the microprocessor accesses the ROB data and forwards the data for execution. Alternatively, if data is not located and forwarded from the ROB, the microprocessor may access the data from the register file 203 for execution. As a third alternative, the microprocessor waits for the data to return from the result data busses before further execution.

Once all source operand data is available, the microprocessor executes the instruction. The functional unit represents a number of processes including, but not limited to, integer multiply, ALU, shifter, floating point, branch, load/store. If the source operand data is not yet ready, the scoreboard forwards the information regarding the location of the data to the early reservation stations (early RS) 204. The detailed description of the early RS 204 is further discussed with reference to FIG. 5. A functional unit executes the instruction when all source operand data becomes available.

The microprocessor forwards the resulting data from the functional units for processing in the next instruction or stores the data in the ROB for future accessing. Alternatively, this embodiment may include the retire reservation station (RS) 132, the graduation buffer (GB) 134, and retire ALU 136, together referred to as the retire queue (RQ) 130, that may act beyond the commit point and prevent instruction stalling in the pipeline.

Data is also stored in the ROB, upon which the scoreboard bits are changed to indicate the data is available in the ROB. Upon completion of an instruction, the instruction is retired and the result data is stored in the register file.

Exemplary Data Flow in Microarchitecture Using Scoreboard Embodiment

Figure 2:
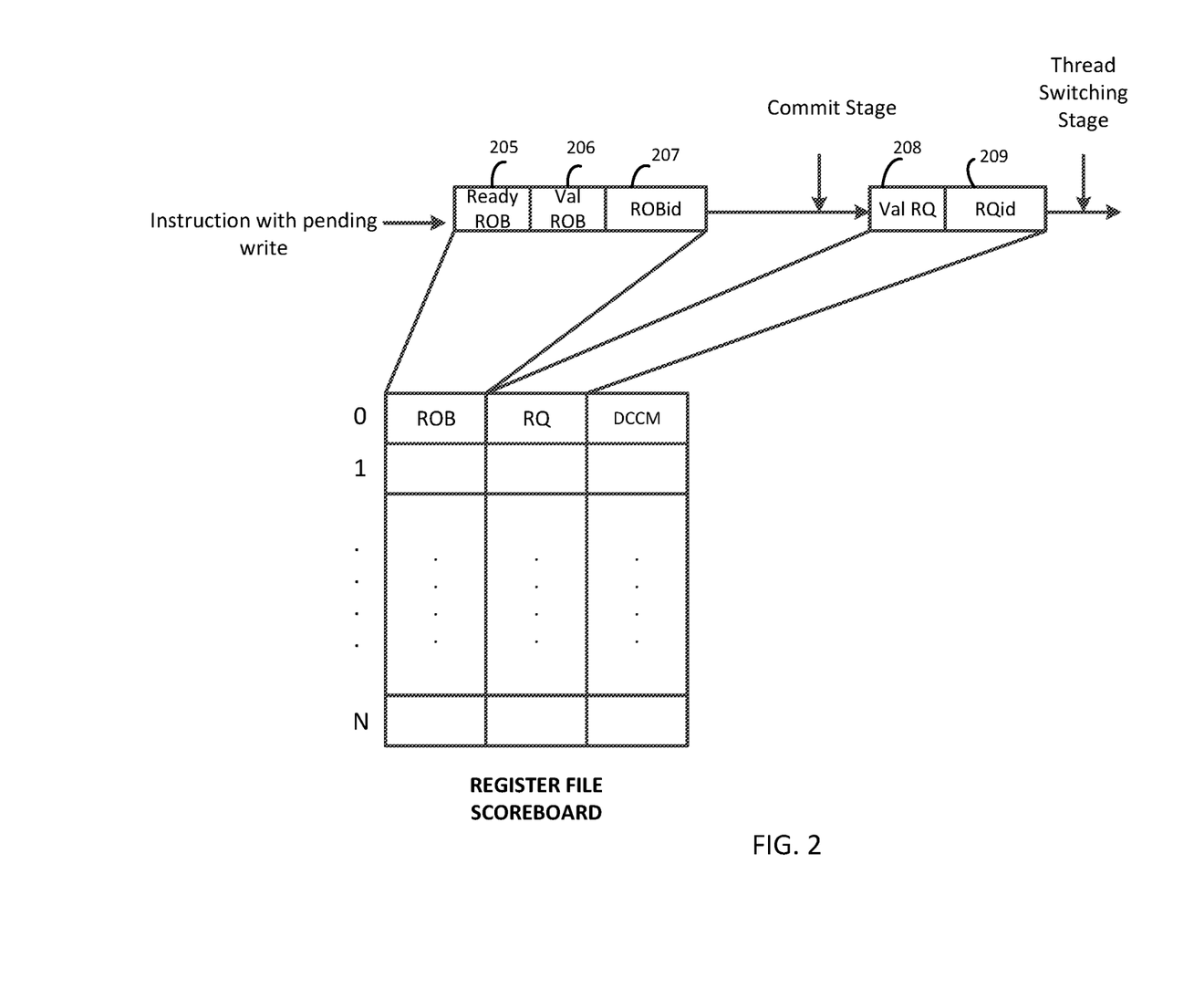
FIG. 2 is an example scoreboard with a total of N entries and bits that comprise the read-in instruction, according to an embodiment.

FIG. 2 illustrates an exemplary process in the scoreboard with N entries, each entry comprising a ready ROB bit 205, a valid ROB bit 206, a ROBid 207, a valid RQ bit 208, and a RQid 209, according to an example embodiment. The numbers 0, 1, . . . N represent the entry number in register file 203 (of FIG. 1) which are referenced as the source or destination registers of the instruction. The process described below may be executed by a microprocessor having the architecture illustrated in FIG. 1. Each entry in the scoreboard indicates the status of the register in the register file. For example, the valid ROB bit 206 and valid RQ bit 208, if high, indicate that the corresponding register in the register file does not have the latest data. The instruction that is responsible for the latest data is in the ROB or the RQ. Therefore, if the valid ROB bit 206 is high, the instruction must get data from ROB or functional units. The instruction that needs to read data with the set valid RQ bit 208 must get data from RQ. The valid ROB bit 206 has higher priority than the valid RQ bit 208 for latest data. If both valid ROB bit 206 and valid RQ bit 208 are not set to high, then the latest data is in the register file 203. The ROBid 207 indicates the entry in the ROB where the data is located. Similarly, the scoreboard may be set up to include pointers for the RQ. The valid RQ bit 208 indicates whether the data resides in the RQ and the RQid 209 indicates the entry in the RQ 130 where the data is located.

The valid ROB bit 206 of the destination register is set to valid when the instruction is decoded and issued to the functional unit. The ROB id 207 is assigned to this instruction. After execution of the instruction, result data is sent to the ROB entry corresponding to the ROB id 207 and the ready ROB bit 205 is set accordingly. The valid ROB bit 206 is set to indicate that the latest data for corresponding register in the register file 203 can be in the ROB or functional unit. The ready ROB 205 bit is set to indicate that the latest data is in the ROB and not in the functional unit. In another embodiment, the ready ROB bit 205 is located in the ROB, and the decoding instruction must access the ROB using the ROB id 207 to find out the status of the latest data. The valid RQ bit 208 is set to valid when the instruction moves to the RQ. The scoreboard 202 clears the valid RQ bit 208 when the instruction retires to the register file 203 or when the instruction retires from the ROB 201 to the register file 203.

Figure 3:
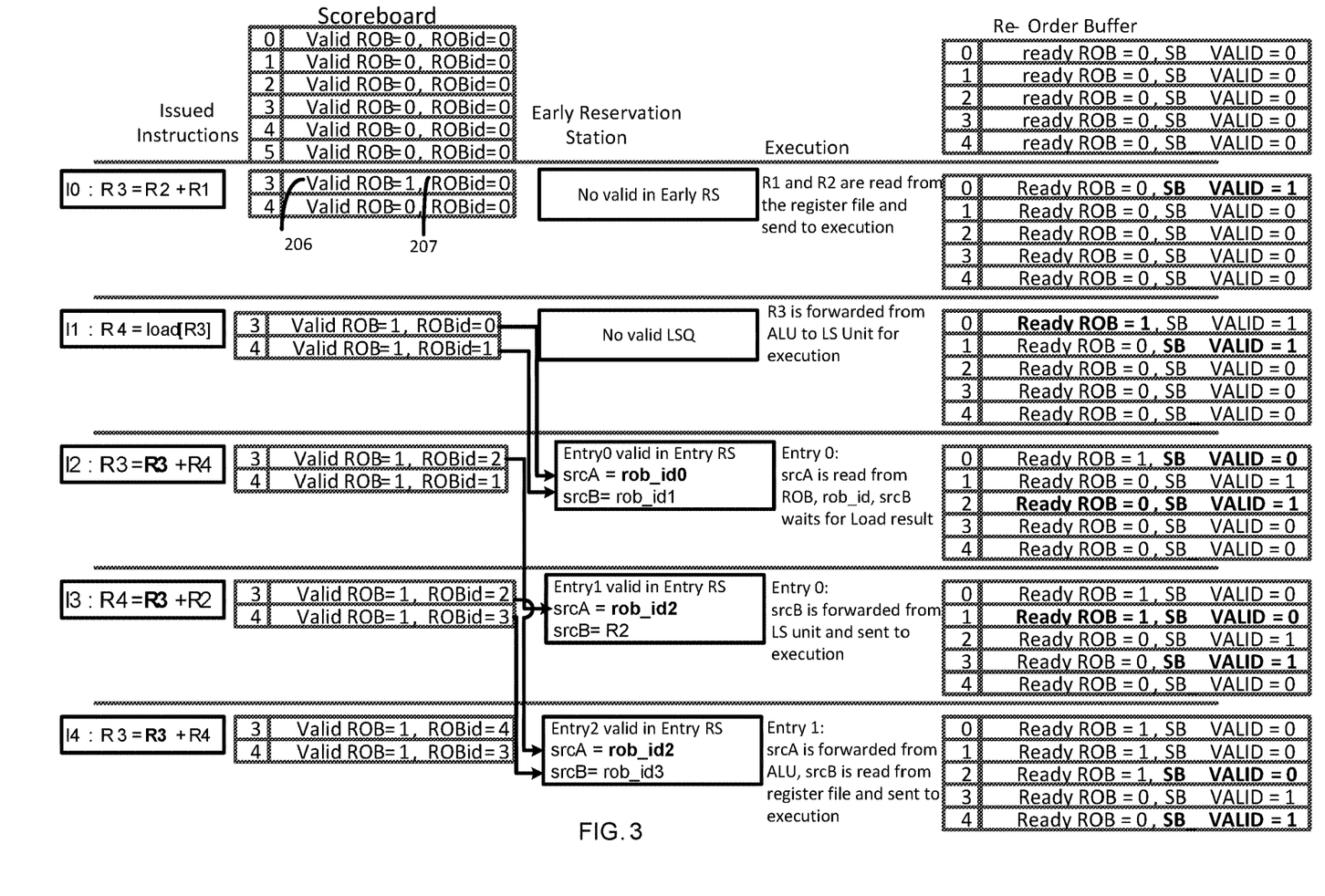
FIG. 3 is an illustration of the dataflow through the scoreboard, ROB, and early RS, following the issue of an instruction, according to an embodiment.

Further detail regarding dataflow following instruction read-in is illustrated in FIG. 3. In this example embodiment, the scoreboard 202 holds a total of six entries whereas the ROB 201 holds five entries. It is noted that the total number of entries is not limited to what is described here and what is shown and described is an example for ease of understanding. Thus, one skilled in the art can appreciate that in various embodiments, the scoreboard 202 may hold tens or hundreds of entries. In various embodiments, the ROB 201 may have 32 or fewer entries (described by 5 or less bits) in order to reduce the amount of time it would require to retrieve data from the ROB 201.

For example, in an embodiment, the scoreboard may include an additional entry that corresponds to (or points to) a status flag register. The execution of each instruction may produce a status flag that may be written into a separate status flag register that stores status flags. In some embodiments, the status flag register has 4 bits. Status flags of an instruction may include, but are not limited to, carry, negative, zero, and overflow. For example, an executed instruction may be an add operation that results in a carry bit. Thus, a carry status flag may be stored in the status flag register at a particular entry. The scoreboard includes an additional entry that points to the location in the status flag register of the carry status flag for the next instruction.

Upon read-in of the first issued instruction "I0", the microprocessor considers the destination register, in this case "R3", and sets the valid ROB bit 206 of the scoreboard entry corresponding to that register (entry 3) to valid. This indicates that the instruction has been read and the data is stored in the ROB 201. ROBid 207 is set to the entry where the data is stored (entry 0) and the SB_valid bit 211, which indicates the status of the data, is set as valid to indicate that the stored data is the most recent value for the destination register. However, the ready ROB bit 205 remains invalid, indicating that the data for the register R3 is not yet available because the source registers should be accessed from the register file (R1 and R2) prior to data execution. Similarly, no valid data exists yet in the early RS 204.

The second issued instruction "I1" indicates that the data stored in register R3 should be loaded in register R4. The valid ROB bit entry in the scoreboard corresponding to the destination register (in this case R4) is set to valid. ROBid in the $4^{th}$ entry of the scoreboard is now set to "1" given the data for this register R4 is stored in entry 1 in the ROB. Here, the prior instruction has yielded a value for register R3 and the ready ROB bit is set to valid (entry 0 in ROB). The value of register R3 is now forwarded to the load store unit for execution.

The third issued instruction "I2" generates a new value for register R3 by summating the previous values stored in register R3 and register R4. The early RS 204 holds the information regarding where the data is located. However, the data in register R4 has not been successfully loaded from the previous instruction as indicated by the ready bit of "0" in entry 1 of the ROB. Thus, the prior value of register R3 may be read first from entry "0" of the ROB and held to wait in the pipeline until the Ready ROB bit is set valid for the load result of register R4 from instruction "I1". Entry 3 in the scoreboard is updated so that ROBid is 2 to reflect that the new value of register R3 is stored in entry 2 of the ROB. The SB_valid bit for entry 2 of the ROB is set to valid to indicate that the most recent value of register R3 resides in entry 2 of the ROB. Given that entry 0 in the ROB no longer holds the most up to date value of R3, the SB_valid bit is set to invalid.

The fourth issued instruction "I3" summates the values of register R3 and register R2 from the source registers to obtain a new value for storage in register R4. The data from register R3 (which is actually retrieved from the ROB in the entry indicated by ROBid=2) and register R2 (stored in the register file) are forwarded to the early RS 204 for execution. The scoreboard is updated (with ROBid=3) to indicate the value for destination register R4 should be stored in entry 3 of the ROB. The SB_valid of this entry 3 is set to valid to indicate the most recent value of R4 whereas the SB_valid of the previous entry (entry 1) is now set to invalid.

The fifth issued instruction "I4" causes the forwarding of the locations of register R3 (entry 2 of ROB) and register R4 (entry 3 of ROB) to the early RS 204 in order to execute the instruction. Given that the destination register is again register R3, the ROBid 207 is updated to the next available entry in the ROB (ROBid=4) and the SB_valid bit of that entry is updated to valid.

These instructions are illustrated here purely as examples of how the scoreboard may be utilized to direct dataflow in the microprocessor architecture and do not intend to limit the scope of how the scoreboard is implemented. For example, another embodiment of the microprocessor architecture can operate without the use of the SB_valid bit in the ROB. The ROBid in the scoreboard may be looked up upon the retirement of the instruction to identify the latest location of the data.

Single Operand Lookup

Figure 4:
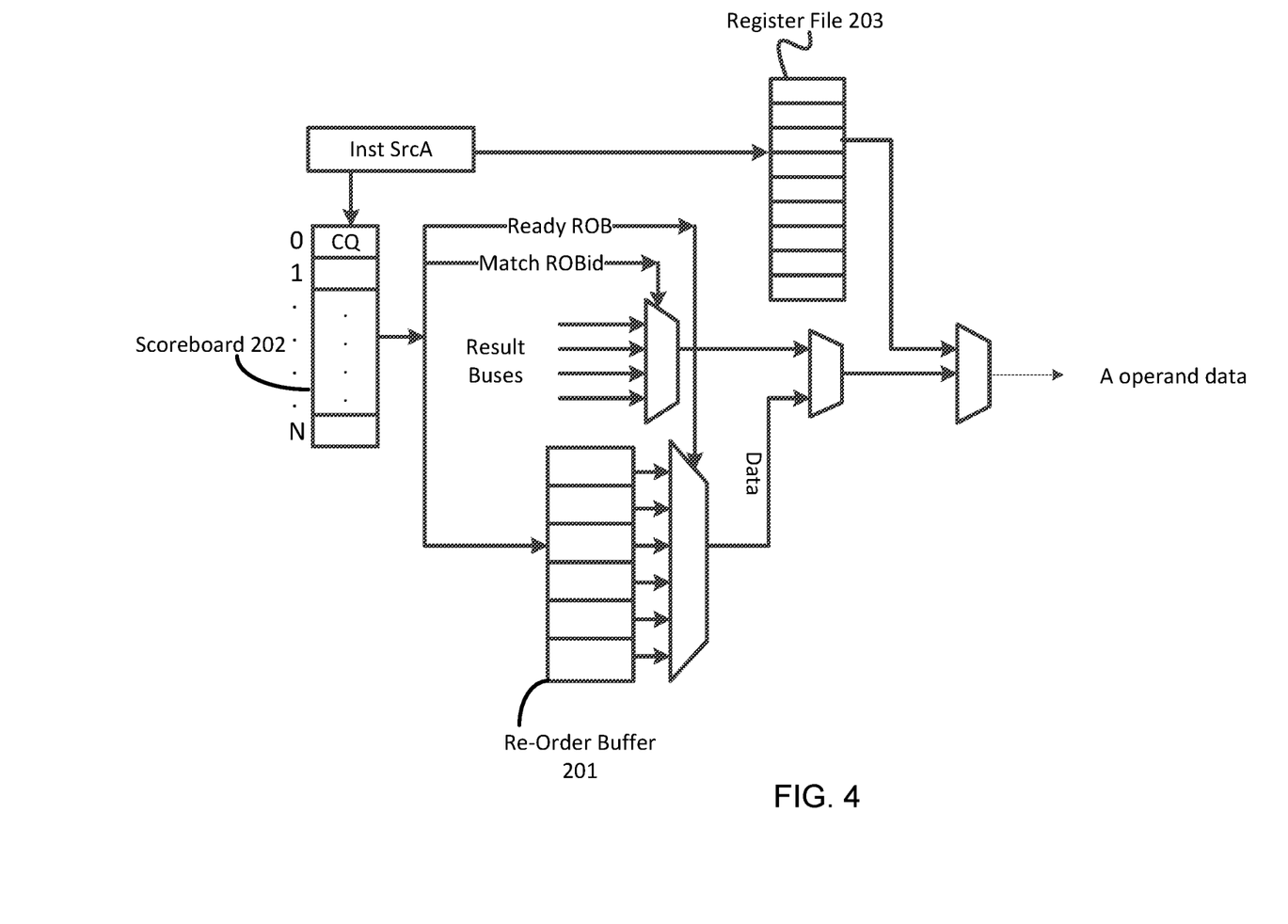
FIG. 4 is an exemplary embodiment of how the instruction is compared to the entries within the scoreboard to obtain the operand data from the ROB, result buses, or register file, according to an embodiment.

FIG. 4 illustrates an embodiment of accessing the data using the scoreboard 202, according to an example embodiment. The scoreboard reads the instruction and determines whether the location of the data is in the ROB 201, the register file 203, or pending execution (e.g. the data is dependent on the execution of a previous instruction). The scoreboard checks the ready ROB bit 205. If the ROB ready bit 205 is high, the data from the ROB 201 is checked. If the data is retired (valid ROB bit 206 should be reset), the operand is read from the register file 203. If the ROB data is valid, ready ROB bit 205 is set and the data is forwarded. If ready ROB bit 205 is invalid, indicating that the data is not yet in the ROB, the third alternative is to wait for the data to be forwarded back from the result busses. For example, the microprocessor checks the intended location of the new data will be stored in and matches that to the ROBid 207 of the scoreboard entry. Upon a match between the ROBid 207 and the destination of the new data, the microprocessor can immediately forward the new data to the appropriate functional unit for execution. Overall, the advantage of the scoreboard would be to check for the presence of the data before fully accessing the entries of the ROB 201 or the register file 203 which would be power and resource intensive.

Instruction Execution

Figure 5:
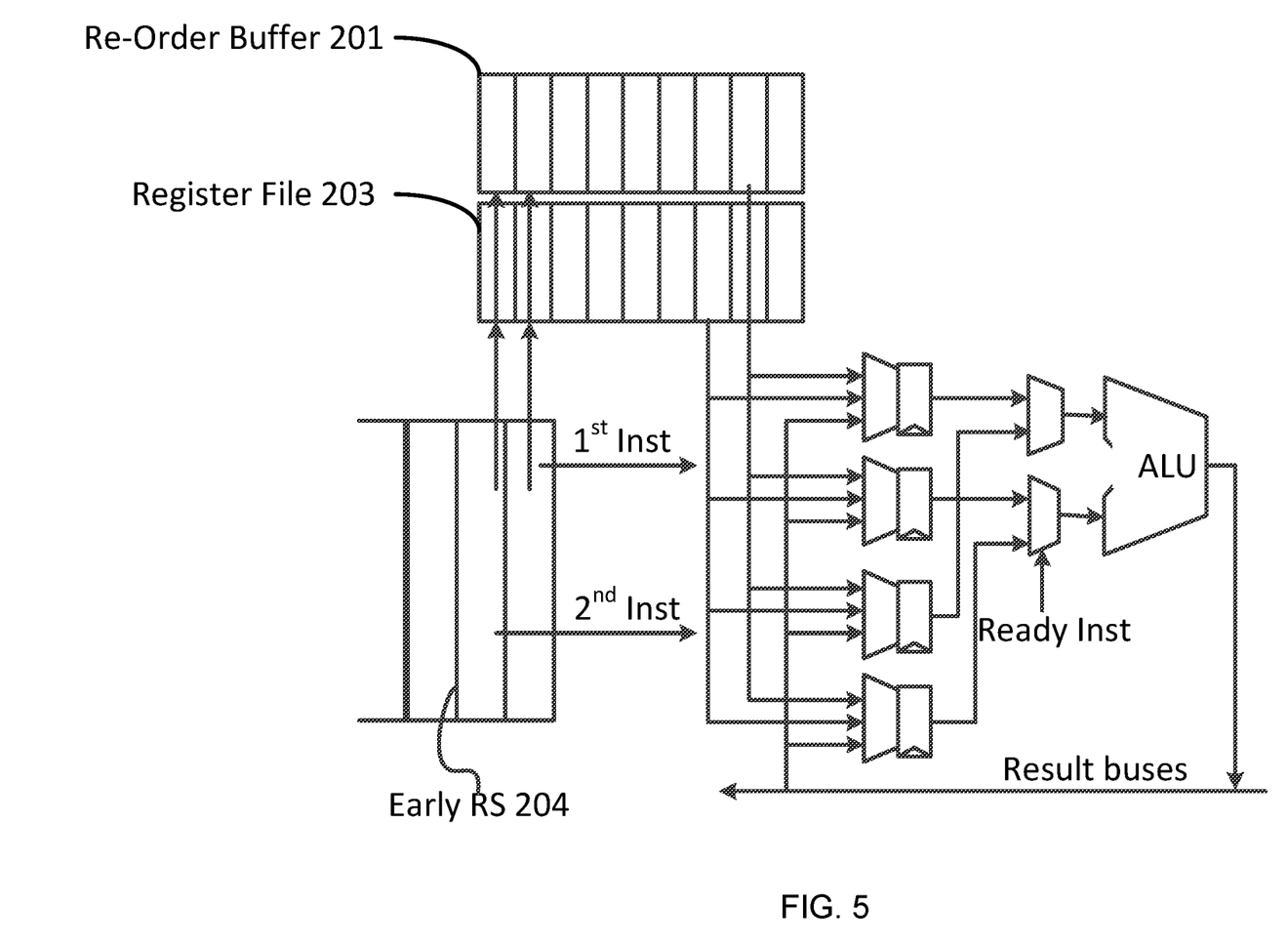
FIG. 5 is an exemplary embodiment of instruction execution following entry into the early RS, according to an embodiment.

FIG. 5 illustrates an embodiment of the handling of instructions by the early RS 204, according to an embodiment. The microprocessor forwards the data location to the early RS 204 from the scoreboard 202. When the source operand data is ready, the respective functional unit executes the instruction, which, in FIG. 5, is an ALU. In one example embodiment, the early RS 204 holds pointer locations and waits for the data to be accessed from the ROB 201, register file 203, or result busses. This can reduce the size, in terms of the width, of the early RS 204, yielding improvements in power consumption and the ability to scale this system. The early RS 204 can handle instructions either in order or out of order. There are at least three different types of execution of instructions from the RS: full out-of-order, limited out-of-order, and in-order. Fully out-of-order instructions involve the ability to send any ready instruction in the reservation station to execution. Additionally, fully out-of-order instructions are the most complex and utilize the highest power consumption. In-order is the simple queue or first-in-first-out execution. Limited out-of-order, as is proposed by this invention, involves a consideration of the first two instructions in the queue. For example, a first instruction may indicate a location of a first data value and a location of a second data value. The early RS may detect that at least one of the first data or second data value is not available at the location indicated by the first instruction. For example, the data value may not yet be available or has been relocated from the location indicated by the first instruction. Thus, the early RS holds the first instruction from execution. The early RS can look at the second instruction and determine if the required data values of the second instruction can be retrieved. If so, the second instruction is executed.

If the second instruction in the queue is executed before the first instruction in the queue, then the second instruction becomes invalid and the third instruction which becomes the second valid instruction can be executed before the first instruction. In one scenario, if the first instruction is waiting for data to be accessed, a second instruction may proceed first if its source operand data is available.

In various embodiments, the microprocessor includes architecture that holds multiple pointers, each pointer pointing to the location of an instruction in the early RS 204. This enables the early RS 204 to handle limited out-of-order instructions. For example, a first pointer may point to a first instruction in the early RS 204 and a second pointer may point to a second instruction in the early RS 204. There may be subsequent pointers that point to subsequent instructions.

The early RS 204 may hold a first instruction and second instruction. If the first instruction is executed, the second pointer that points to the second instruction may be copied to replace the first pointer. A subsequent instruction may then be retrieved. The second pointer may be incremented to obtain a subsequent pointer that corresponds to the subsequent instruction. Alternatively, the early RS 204 may execute a second instruction before the first instruction. In this scenario, the first pointer and first instruction are not changed. The second pointer is incremented to obtain a subsequent pointer and a subsequent instruction is retrieved to replace the second instruction.

Instruction Decoding

Figure 6:
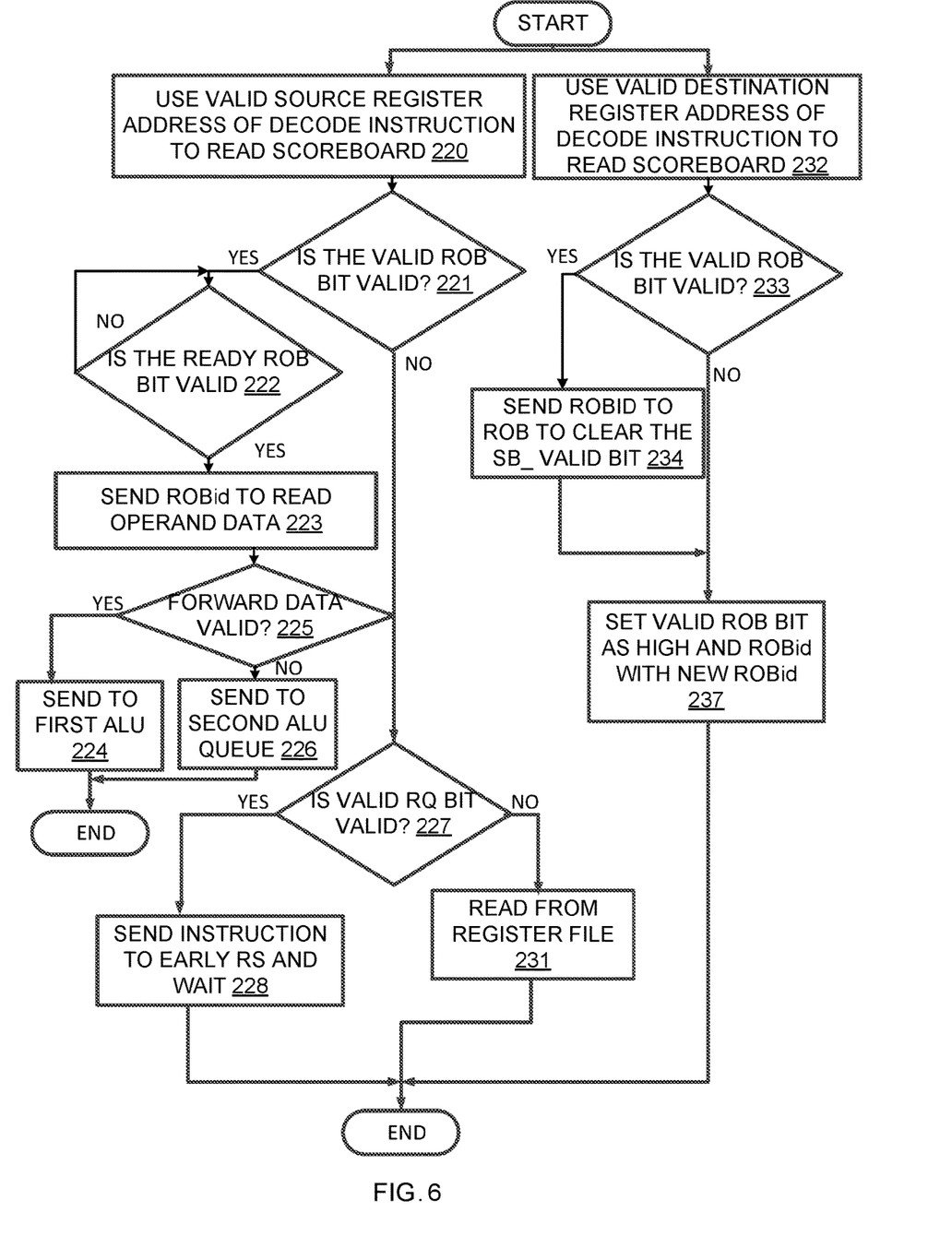
FIG. 6 is a flow diagram of the method of decoding the instruction, according to an embodiment.

FIG. 6 is a flowchart describing the decoding process when receiving an instruction, according to an example embodiment. In one example embodiment, the process described herein may be executed by a microprocessor, such as the microprocessor as depicted in FIG. 1. The instruction is decoded for valid source and destination registers. The microprocessor reads 220 the scoreboard 202 using the valid source register address of the decode instruction. The microprocessor checks the scoreboard 202 at 221 for the validity of the valid ROB bit 206. If the bit is valid, indicating that the data resides or will reside in the ROB 201, the microprocessor checks the ready ROB bit 205 to see if the data in the ROB is valid at 222. If the ready ROB bit 205 is invalid, meaning that data is not in ROB 201, the microprocessor continues to check 225 to see if data are being forwarded from functional units (FIG. 1). If so, the data is sent to the first ALU (not shown) at 224 for immediate execution. If not, the data is sent to the early RS 204 at 226. Back to step 222, if the ready ROB bit 205 is valid, then the ROBid 207 is sent to ROB 201 to retrieve the operand data at 2223, and the data is sent to the first ALU at 224. Alternatively, if the valid ROB bit 206 is invalid at 221, the scoreboard checks to see if the data resides in the RQ 130 by checking the valid RQ bit 208 at 227. If valid, the instruction is sent 228 to the early RS 204 to wait for the data to be written back through the result busses. If the valid RQ bit 208 is invalid, the microprocessor retrieves the data from the register file at 231.

When processing the destination register, the microprocessor reads the scoreboard 202 at 232 using the destination register address of the decode instruction. The scoreboard 202 checks for the valid ROB bit 206 to determine whether prior data resides in the ROB 201 at 233. If the bit is valid, the ROBid 207 is sent to the ROB 201 to clear the SB_valid bit at 234 and the ROBid 207 from this current instruction is set. The ROBid 207 is set with the current instruction (new ROBid) at 237. When an entry is retired from the ROB, the SB_valid bit is used to clear the scoreboard for the destination register.

Instruction Retiring

Figure 7:
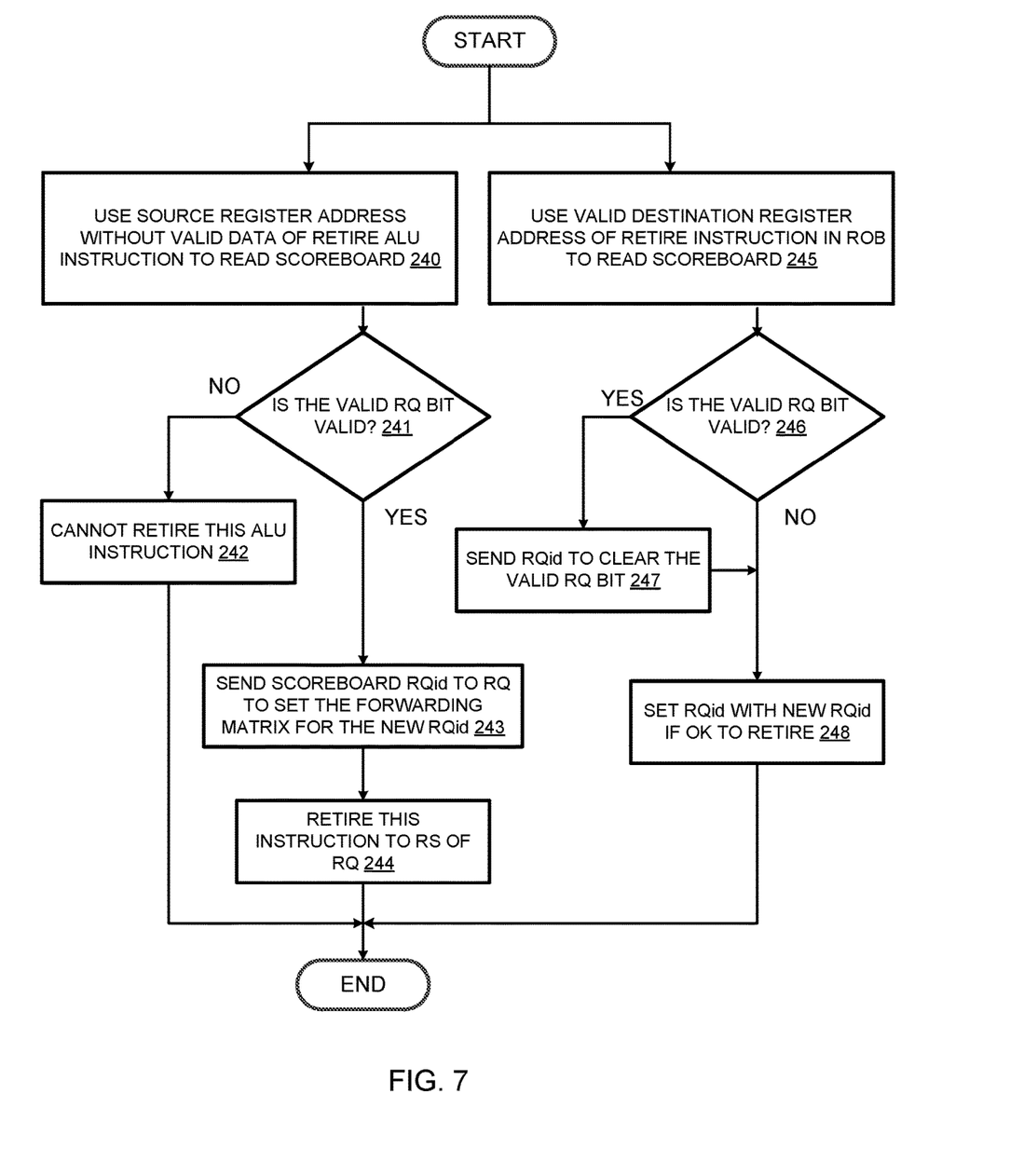
FIG. 7 is a flow diagram of the method of retiring the instruction, according to an embodiment.

FIG. 7 is a flowchart describing the data retiring process, according to an example embodiment. In one example embodiment, the process described herein may be executed by a microprocessor, such as the microprocessor as depicted in FIG. 1. Three types of instructions can be retired from ROB. The first type is when a completed instruction can be retired and the result data is written back to register file. The second type is when the long latency instruction, without valid result data, can be retired and is sent to the GB 134. The third type is when the ALU instruction with only data dependency on instructions in the retire queue 130 is sent to the reservation station 132. FIG. 7 describes the mechanism for retiring the third type of instruction from ROB 201 where the microprocessor reads the scoreboard 202 at 240 using the source register address. The microprocessor checks at 241 the valid RQ bit 208 to determine whether the data resides in the RQ 130. If not valid, the data has not entered RQ yet and thus the ALU instruction cannot be retired at 242. If valid RQ bit 208 is valid, the RQid 209 is sent to the RS 132 in order to set the forwarding matrix to the RQid 209 of the next instruction set at 243. This instruction can be retired to the retire RS 132 of the RQ 130 at 244. If the destination register address is being processed, the microprocessor reads the scoreboard 202 at 240 using the destination register address. The valid RQ bit 208 is checked at 246. If valid, the RQid 209 is sent at 247 to the RQ 130 in order to clear the valid RQ bit 208. The RQid 209 can now be set to the RQid of the next instruction at 248. If valid RQ bit 208 is invalid, indicating data is not in the RQ 130, the RQid 209 is set to the new instruction at 248.

The scoreboard, which holds the location of the latest data (e.g. in the ROB, in the register) may significantly improve the efficiency of the microprocessor by reducing the consumption of resources (e.g. power, time, money).

For example, conventional implementations currently require a large early RS (e.g. 32 or 64 bits of source operand data) to store instructions and data. Thus, processing of instructions and source operand data through the early RS becomes a resource intensive process as well. With the implementation of a scoreboard, the early RS only needs to handle information as to the location of the data (e.g. ROB pointers that direct the early RS to the location of the data). Thus, this only requires a small number of bits (e.g. 5 bits for 32-entry ROB) as opposed to the actual data (large number of bits). Thus, the current implementation of the scoreboard may enable the use of early RS 204 hardware that is smaller in size (e.g. 5 bits).

Secondly, the implementation of the scoreboard also affords the early RS the additional benefit of handling instructions out of order. Conventionally, the early RS holds the data and must wait for source operand data to arrive before the instruction can be processed. With the scoreboard implementation, the early RS only holds the instructions and may process the instructions out of order if the source operand data for the subsequent instruction is available. This yields an overall benefit in the efficiency of the microprocessor.

Thirdly, the implementation for scoreboard for RQ allows the instructions in early RS to move to RQ, allowing subsequent instructions to be executed and moved to the pipeline. More instructions pushing through the pipeline means higher performance.

Additionally, the implementation of the scoreboard can enable the microprocessor to locate the data more rapidly and with fewer resources than conventional methods. Traditionally, the microprocessor checks the ROB for the data. If the data is not present in the ROB, the microprocessor has to check the register file as well. This is a resource costly process. With the current implementation, the microprocessor can simply check the ready bit in the scoreboard entry to identify if the data resides in the ROB. If so, the microprocessor retrieves it from the ROB. If the ready bit is invalid, the microprocessor can avoid checking the ROB altogether, thereby saving the time required to access the ROB. The microprocessor can retrieve the data from the register file directly or wait for the results to written back through the data busses. If the microprocessor waits for the results, the microprocessor monitors the result busses for new data, matches the intended location of newly data with the ROBid 207 of the scoreboard entry, and forwards the new data to the appropriate functional unit for execution. Avoiding the need to search the ROB for the data significantly reduces the resource consumption of the microprocessor and yields overall improvements in the microprocessor efficiency.

Example Machine

Figure 8:
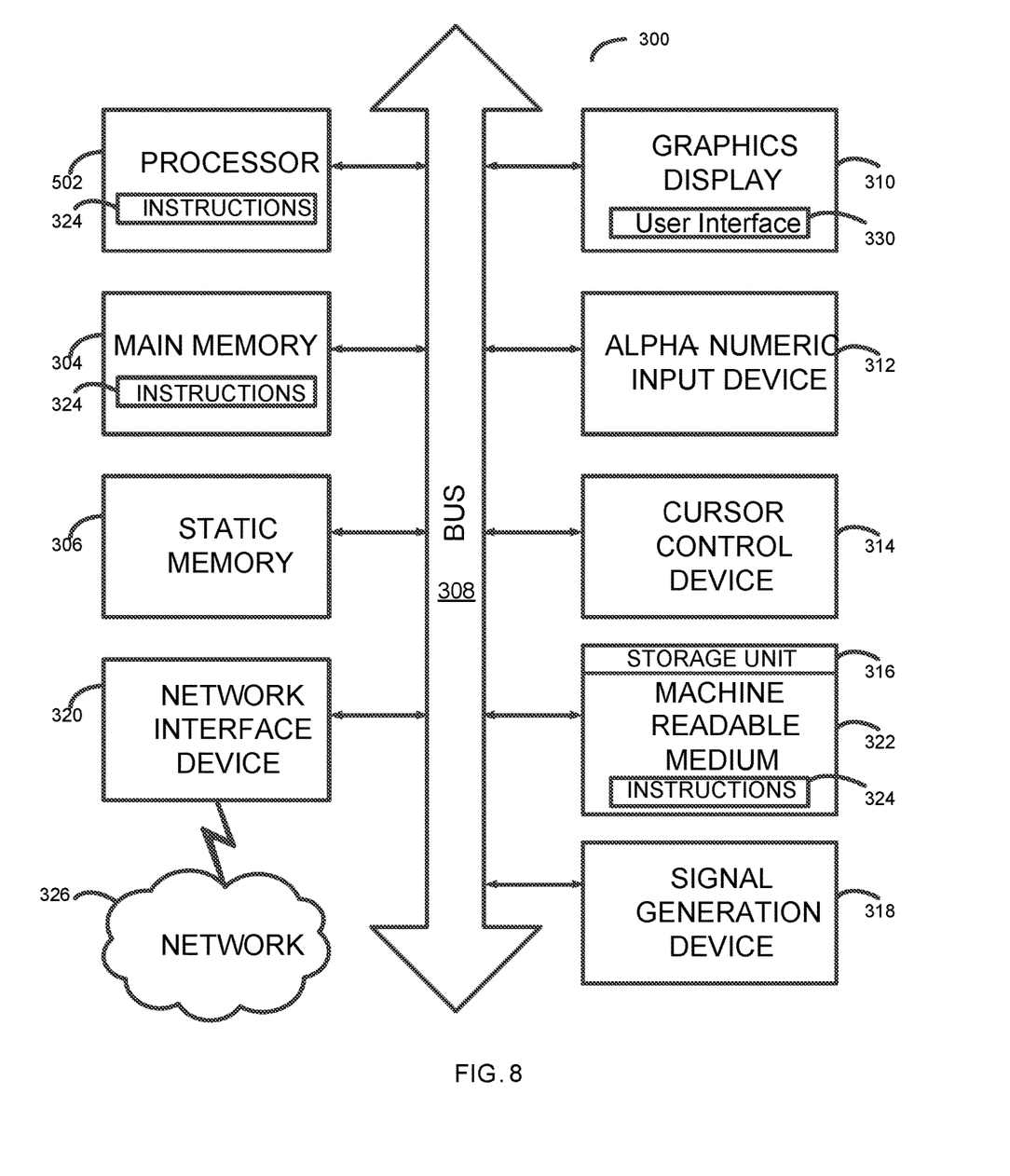
FIG. 8 is a block diagram illustrating components of a machine able to read instructions from a machine-readable medium and execute them in a processor, according to one embodiment.

FIG. 8 is a block diagram illustrating components of an example machine able to read instructions from a machine-readable medium and execute them in a processor (or controller). Specifically, FIG. 8 shows a diagrammatic representation of a machine in the example form of a computer system 300 within which one or more instructions 324 (e.g., software or program or program product) for causing the machine to perform any one or more of the methodologies discussed herein may be executed. The computer system 300 may be used to perform operations associated with designing a test circuit including a plurality of test core circuits arranged in a hierarchical manner. In one embodiment, the processor 302 of the example computer system 300 may be implemented with the circuits and other components described above, such as the third ALU and scoreboard.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include graphics display unit 310 (e.g., a plasma display panel (PDP), a liquid crystal display (LCD), a projector, or a cathode ray tube (CRT)) with a user interface 330. The computer system 300 may also include alphanumeric input device 312 (e.g., a keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320. The machine-readable medium 322 may also store a digital representation of a design of a test circuit.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONFIGURATION CONSIDERATIONS

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs for detachable camera mounts as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein.

What is claimed is:

1. A method for a microprocessor, the method comprising:

receiving an instruction comprising a register address;

fetching a scoreboard entry corresponding to the register address, the scoreboard entry comprising a valid re-order buffer bit, a valid retire queue bit, and a re-order buffer ID indicating a location of data in a re-order buffer, wherein a combination of a value of the valid re-order buffer bit and a value of the valid retire queue bit references a location of data indicated by the register address, an allocation of the data being at one of the re-order buffer, a retire queue, and a register file;

determining a value of the valid re-order buffer bit, the valid re-order buffer bit indicating a validity of a corresponding entry in the re-order buffer; and responsive to determining that the valid re-order buffer bit is set to valid, fetching data from a selected entry in the re-order buffer that is indicated by the re-order buffer ID;

responsive to determining that the valid re-order buffer bit is set to invalid and that the valid retire queue bit is set to valid, fetching data from the retire queue and sending the instruction to an early reservation station; and responsive to determining that the valid re-order buffer bit is set to invalid and that the valid retire queue bit is set to invalid, fetching data from the register file.

2. The method of claim 1, further comprising:

sending the data of the selected entry in the re-order buffer to a functional unit queue for further processing, the data of the selected entry in the re-order buffer corresponding to the re-order buffer ID and the valid re-order buffer bit.

3. The method of claim 1, wherein the scoreboard entry further comprises:

a ready re-order buffer bit providing an indication if the re-order buffer contains a latest data for the register address.

4. The method of claim 1, wherein the register address is a source register address.

5. The method of claim 1, further comprising:

transmitting the re-order buffer ID to the re-order buffer for clearing a scoreboard valid bit located in an entry of the re-order buffer;

setting the valid re-order buffer bit in the scoreboard entry corresponding to the register address to valid; and setting the re-order buffer ID to a new value corresponding to a different entry in the re-order buffer.

6. The method of claim 5, wherein the register address is a destination register address.

7. A method for a microprocessor, the method comprising:

receiving a plurality of instructions at an early reservation station, wherein each instruction of the plurality of instructions is received by:

fetching a scoreboard entry corresponding to a register address of an instruction, the scoreboard entry comprising a valid re-order buffer bit and a valid retire queue bit, wherein a combination of a value of the valid re-order buffer bit and a value of the valid retire queue bit references a location of data indicated by the register address, an allocation of the data being at one of the re-order buffer, a retire queue, and a register file;

responsive to determining that the valid re-order buffer bit is set to invalid and that the valid retire queue bit is set to valid, fetching data from the retire queue and sending the instruction to the early reservation station, wherein the early reservation station has a first pointer referencing a location of a first instruction in the early reservation station and a second pointer referencing a location of a second instruction in the early reservation station;

determining that at least one data value indicated by the first instruction is not available at a data location indicated by the first instruction;

determining that required data values of the second instruction can be retrieved;

submitting the second instruction for execution by an associated functional unit of the microprocessor prior to retrieval of the at least one data value of the first instruction; and incrementing, a value of the second pointer to a location of a next instruction in the early reservation station.

8. The method of claim 7, wherein the first pointer points to the location of the first instruction in the early reservation station and the second pointer points to the location of the second instruction in the early reservation station, the method further comprising:

copying, responsive to sending the first instruction to an associated functional unit for execution, a value of the second pointer to the first pointer; and incrementing the value of the second pointer to a location of the next instruction in the early reservation station.

9. The method of claim 7, wherein the first instruction is held from execution until the at least one data value is forwarded from a result bus.

10. The method of claim 9, wherein the at least one data value is identified by matching a re-order buffer ID in the first instruction with an intended re-order buffer ID of the at least one data value.

11. A microprocessorsystem, comprising: a re-order buffer comprising M number of entries; and a scoreboard comprising N number of entries, each scoreboard entry corresponding to a register address of an instruction, each scoreboard entry comprising a valid re-order buffer bit, a valid retire queue bit, and a re-order buffer ID indicating a location of data in the re-order buffer, wherein a combination of a value of the valid re-order buffer bit and a value of the valid retire queue bit references a location of data indicated by the register address, an allocation of the data being at one of the re-order buffer, a retire queue, and a register file, wherein the valid re-order buffer bit, when determined to be set to valid, causes the microprocessor system to fetch data from an entry in the re-order buffer corresponding to the location indicated by the re-order buffer ID, the valid re-order buffer bit indicating a validity of a corresponding entry in the re-order buffer, wherein the valid re-order buffer bit, when determined to be set to invalid, and the valid retire queue bit, when determined to be set to valid, cause the microprocessor system to fetch data from the retire queue and send the instruction to an early reservation station, and wherein the valid re-order buffer bit, when determined to be set to invalid, and the valid retire queue bit, when determined to be set to invalid, cause the microprocessor system to fetch data from the register file.

12. The microprocessor system of claim 11, wherein each scoreboard entry further comprises a ready re-order buffer bit, wherein the ready re-order buffer bit is set to valid when data is stored in an entry of the re-order buffer, the entry of the re-order buffer corresponding to the value of the re-order buffer ID.

13. The microprocessor system of claim 12, wherein the valid re-order buffer bit, when set to valid, indicates that data is or will be stored in the re-order buffer.

14. The microprocessor system of claim 11, further comprising one or more functional units.

15. The microprocessor system of claim 14, wherein each scoreboard entry further comprises a retire queue ID.

16. The microprocessor system of claim 15, wherein the valid retire queue bit of an entry in the scoreboard is set to valid when data is stored in an entry of the retire queue, the entry of the retire queue corresponding to the value of the retire queue ID.

17. The microprocessor system of claim 11, wherein the scoreboard has an additional entry that further comprises a status flag of instruction execution.

18. The microprocessor system of claim 11, wherein the microprocessor is a component of a computer system, the computer system comprising at least one of a memory, graphics display unit, and a storage unit.

* * * * *